United States Patent [19]

Conn, Jr.

[11] 4,450,338

[45] May 22, 1984

[54] METHOD OF FABRICATING A TRUSS CORE SANDWICH PANEL

[75] Inventor: Charles E. Conn, Jr., Riverside, Calif.

[73] Assignee: TRE Corporation, Beverly Hills, Calif.

[21] Appl. No.: 374,766

[22] Filed: May 4, 1982

[51] Int. Cl.³ .................... B23K 11/00; B23K 11/06
[52] U.S. Cl. ........................ 219/78.12; 219/78.11; 219/160; 219/117.1
[58] Field of Search .............. 219/78.12, 78.11, 78.02, 219/160, 117.1, 81, 82, 83; 228/181

[56] References Cited

U.S. PATENT DOCUMENTS 2,876,333 3/1959 Argentin ..................... 219/78.12 x
3,162,746 12/1964 Rohr ........................... 219/78.12 X
3,453,717 7/1969 Pfaffenberger .............. 219/78.12 X

FOREIGN PATENT DOCUMENTS 239174 4/1960 Australia .

Primary Examiner—B. A. Reynolds
Assistant Examiner—Catherine M. Sigda
Attorney, Agent, or Firm—Spensley, Horn, Jubas & Lubitz

[57] ABSTRACT

A method of fabricating a truss core sandwich panel of the type including first and second face sheets secured on opposite sides of a corrugated sheet. The first face sheet is welded to one side of the corrugated sheet and the second face sheet is positioned in contact with the other side of the corrugated sheet. A conductive mandrel is positioned between the first face sheet and the corrugated sheet, the height of the mandrel being less than the distance between the first face sheet and the corrugated sheet by a predetermined amount. The first and second face sheets are positioned between opposed welding electrodes, with the mandrel being coplanar with the electrodes. A welding force is applied to the first and second face sheets by means of the electrodes, the force being sufficient to deflect the first face sheet into contact with the mandrel and to bring the mandrel into contact with the corrugated sheet to permit electrical continuity between the electrodes. The predetermined amount is such that the deflection of the first face sheet will not exceed the yield point of the material thereof. A current is passed between the first and second electrodes to weld the second face sheet to the corrugated sheet and the welding force is released. The mandrel is moved to a new location and the process is repeated.

14 Claims, 6 Drawing Figures

METHOD OF FABRICATING A TRUSS CORE SANDWICH PANEL

BACKGROUND OF THE INVENTION

1. Field of the Invention

The present invention relates to a method of fabricating a truss core sandwich panel and, more particularly, to an economically feasible method for fabricating lightweight, high strength structural sandwich panel materials which are stabilized by a truss shaped core.

2. Description of the Prior Art

Solid metal plates, made from either steel or aluminium, are common structural members. Plate materials have the advantage of being quite strong, but the disadvantage of being quite heavy.

At the other end of the spectrum is a structural panel of the honeycomb core type. A honeycomb core panel is much more efficient than a plate material in that it can achieve significant buckling strength at a significantly reduced weight. On the other hand, one of the problems with a honeycomb core panel is that it is limited to relatively thin face sheets and it is quite expensive to manufacture.

Between the extremes of plate material and honeycomb core panels is what is commonly referred to as a truss core sandwich panel which is fabricated utilizing two face sheets stabilized by a corrugated sheet or truss core. Such a truss core sandwich panel, while not being quite as efficient in the buckling mode as a conventional honeycomb core panel, is much more efficient than plate material, much lighter than plate material, and can be made with face sheets of significantly heavier gauge than possible with a honeycomb core panel.

The difficulty encountered heretofor with truss core sandwich panels is in the attachment of the second face sheet, which is a difficult and costly fabrication process. That is, once the first face sheet is connected to one side of the corrugated sheet, that side of the corrugated sheet is no longer available for contact in connecting the other side thereof to the second face sheet. As a result, the second face sheet has been secured to the corrugated sheet in a variety of different manners.

For example, this type is truss core sandwich panel is commonly used in structural parts for airplanes where rivets are used. The first face sheet is attached to the corrugated sheet with driven rivets and generally the second face sheet is attached to the core using blind rivets. Rivets are generally satisfactory for heavy gauge materials, although the fabrication process is time consuming, typically because of the necessity to countersink the heads of the rivets to make them flush with the outer surface of the panel for aircraft-type applications. With thin panels, rivets are simply unacceptable.

Brazing and bonding joining techniques can be utilized for complete components but are not adaptable to a panel material for subsequent fabrication into a structure. That is, in either brazing or bonding, a low melting point alloy or glue is used between the corrugated sheet and the second face sheet and the entire panel is subjected to elevated temperatures to cause curing of the connecting material. However, if a panel formed in this manner is to be subsequently machined and welded in a complete component, the welding will cause the bonding or brazing material to deteriorate, thereby contaminating the weld.

Laser welding and electron beam welding are possible techniques for joining the second face sheet to the corrugated sheet. However, the welds are typically so narrow that at least two passes must be made to make a structural connection. Furthermore, electron beam and laser welding equipment is very expensive and takes much more time than coventional resistance welding techniques.

Because of the above difficulties, truss core sandwich panels are used almost exclusively in the fabrication of detailed structural components wherein the face sheets are stabilized by a truss core and joined by resistance welding. These components are relatively small (short in the corrugation direction) and the second face sheet is resistance welded to the truss core using a mechanically expandable mandrel. That is, a multiple-part mandrel is fabricated so that in its collapsed condition, it may be positioned between the first face sheet and the corrugated sheet, where the corrugated sheet contacts the second face sheet. The mandrel is then mechanically expanded to the height of the corrugated core is as to fill the gap between the first face sheet and the corrugated sheet. The first and second face sheets are positioned between opposed welding electrodes, with the expandable mandrel coplanar with the electrodes. By passing a current between the first and second electrodes, the second face sheet may be welded to the corrugated sheet. Then, the mandrel is collapsed mechanically and the steps repeated.

While the above process works, the expandable mandrel is expensive to fabricate and the process is simply too slow, making the finished product overly expensive. While such a slow, expensive process is suitable for a detailed structural component, it would not be suitable for the fabrication of a family of truss core sandwich panels which may be used as a structural panel building material in the manufacture of completed components.

In fabricating a family of truss core sandwich panels for use as a structural panel building material, it is desirable to fabricate the panels in significant lengths, such as up to twelve feet. If resistance welding is the joining process, it is necessary to use a mandrel and to have the mandrel extend between the truss core and the first face sheet connected thereto. Obviously, this can be done with an expandable mandrel, but with the problems discussed previously. If a solid mandrel is used, it would have to be at least as long as the panel, in excess of twelve feet. Initially, it would be extremely expensive to manufacture a copper mandrel this long and the mandrel would be quite heavy. Any slight deformation of the panel due to weld distortion would cause a curvature of the panel, making it virtually impossible to remove the mandrel.

Another possibility would be to slot the mandrel every few inches to provide bending flexibility. While this approach might work well for a few rows of welds, after continued use, the edges of the slots would break down from the electrode wheel pressure, thus causing local welding problems. Also, from continued use in flexing, the mandrels would break at the slots.

Another possible technique for providing the mandrel with bending flexibility would be to reduce the height of the mandrel, by say 0.050", and to add a 0.050" copper strip to the back of the mandrel. In this case, the copper strip is flexible so that after welding, the copper strip may be pulled out and this added mandrel clearance will allow for easy removal of the mandrel, even in a distorted panel. While this system has potential, when considering larger panels and an automated welding machine with multiple electrodes, an excessive amount of electrode copper mandrel material per panel would be required.

SUMMARY OF THE INVENTION

According to the present invention, these problems are solved by the provision of an economically feasible method for fabricating lightweight, high strength, structural sandwich panel materials stabilized by a truss shaped core. The present fabrication method permits the formation of a family of truss core sandwich panels of various face sheet/core sheet thicknesses and core heights for use as a structural panel building material. Resistance welding is the joining process and conventional resistance welding equipment may be used. Mechanically expandable mandrels are eliminated, as well as long, expensive and heavy copper mandrels.

Instead of utilizing an expandable mandrel, the present invention takes advantage of the permissible elastic deformation of the face sheet material caused by applied electrode force to achieve the required electrical contact with a simple undersized mandrel. Since all materials are elastic, an applied force will cause deflection of the material and the material will return to the original static position upon removal of the force, as long as the yield point of the material is not exceeded. Utilizing this principle, the present process contemplates accurately forming the corrugated core and calculating the allowable face sheet elastic deflection. A mandrel is selected which will permit this amount of deflection and no more. During resistance welding, a sufficient electrode pressure is applied to deflect the face sheet to contact the mandrel for electrical continuity. After resistance welding and removal of the electrode force, the face sheet will elastically return to its static position, allowing the mandrel to be moved to another position.

Briefly, the present method of fabricating a truss core sandwich panel of the type including first and second face sheets secured on opposite sides of a corrugated sheet comprises the steps of welding the first face sheet to one side of the corrugated sheet, positioning the second face sheet in contact with the other side of the corrugated sheet, positioning a conductive mandrel between the first face sheet and the corrugated sheet, at the location of greatest spacing between the first face sheet and the corrugated sheet, the height of the mandrel being less than the distance between the first face sheet and the corrugated sheet by a predetermined amount, positioning the first and second face sheets between opposed welded electrodes, the mandrel being coplanar with the electrodes, applying a welding force to the first and second face sheets by means of the electrodes, the force being sufficient to elastically deflect the first face sheet so that opposite sides of the mandrel are in contact with the first face sheet and the corrugated sheet to permit electrical continuity between the electrodes, the predetermined amount being such that the deflection of the first face sheet will not exceed the yield point of the first face sheet, passing current between the first and second electrodes to resistance weld the second face sheet to the corrugated sheet, and releasing the welding force. The mandrel may now be moved to a new location between the first face sheet and the corrugated sheet and the welding process repeated.

OBJECTS, FEATURES AND ADVANTAGES

It is therefore an object of the present invention to solve the problems encountered heretofor in using resistance welding to fabricate a truss core sandwich panel. It is a feature of the present invention to solve these problems by the use of an undersized conductive mandrel which may be simply moved between a corrugated sheet and a face sheet and which will necessitate elastic deflection of the face sheet during welding where the deflection will not permit the yield point of the material to be exceeded. An advantage to be derived is an economically feasible method for fabricating a truss core sandwich panel. A further advantage is the fabrication of a family of truss core sandwich panels which may be used as structural panel building materials. A still further advantage is the elimination of the need for mechanically expandable mandrels. Still another advantage is the elimination of the difficulties encountered when using brazing and bonding techniques. Another advantage is the elimination of expensive riveting, laser welding and electron beam welding techniques. Another advantage is the elimination of massive and expensive copper mandrels.

Still other objects, features, and attendant advantages of the present invention will become apparent to those skilled in the art from a reading of the following detaled description of the preferred embodiment constructed in accordance therewith, taken in conjunction with the accompanying drawings wherein like numerals designate like parts in the several figures and wherein:

DESCRIPTION OF THE PREFERRED EMBODIMENT

Figure 1:
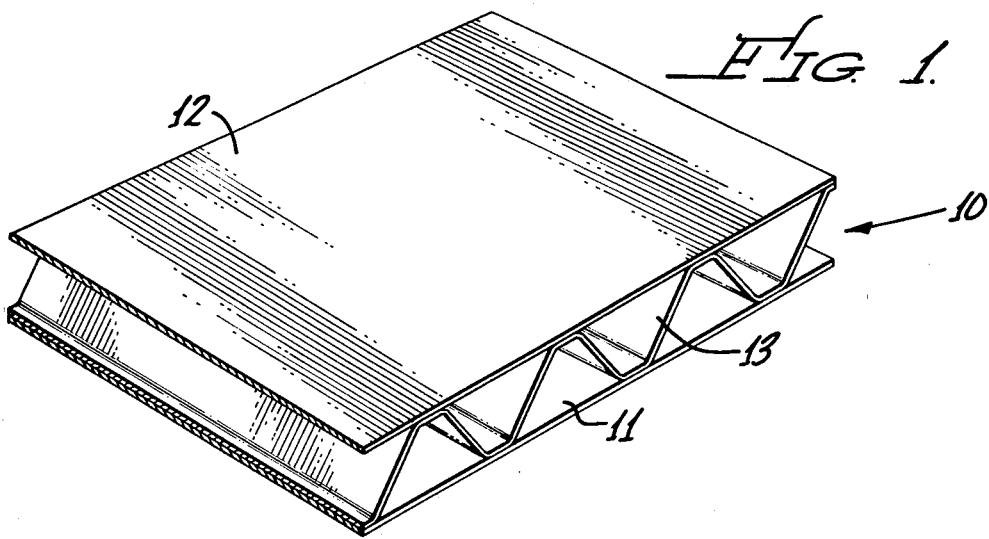
FIG. 1 is a partial perspective view of a truss core sandwich panel including first and second face sheets secured on opposite sides of a corrugated sheet.

Referring now to the drawings and, more particularly, to FIG. 1 thereof, there is shown a small portion of a truss core sandwich panel, generally designated 10, of the type including first and second face sheets 11 and 12 secured to opposite sides of a corrugated sheet or truss core 13. It is the object of the present invention to fabricate a family of panels 10 in large sheets, such as 4'×12', having various dimensions, sheet thicknesses and the like. Such panels would be structurally efficient and lightweight and suitable for use in a wide variety of structural components. It is also an object of the present invention to manufacture panels 10 in an economically feasible manner using resistance welding.

Figure 2:
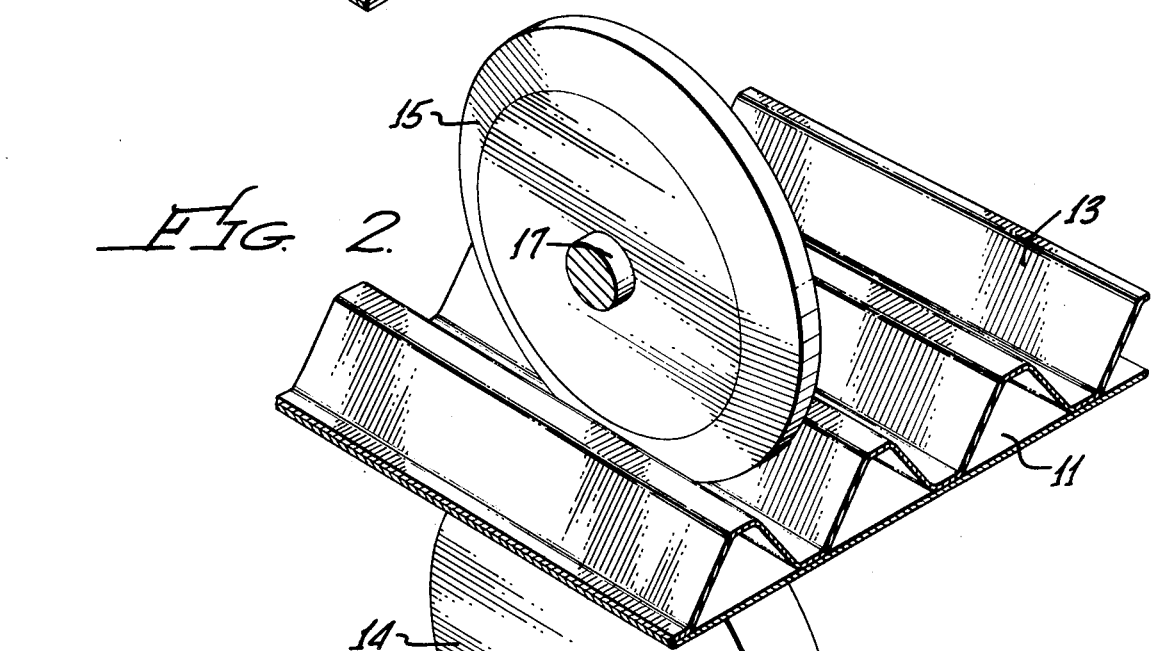
FIG. 2 is a perspective view showing the manner of resistance welding the first face sheet to one side of the corrugated sheet.

Referring now to FIG. 2, the connection of corrugated sheet 13 to face sheet 11 proceeds in a simple and efficient manner. That is, one side of corrugated sheet 13 is positioned in contact with one side of face sheet 11 and face sheet 11 and corrugated sheet 13 are positioned between opposed welding electrodes, here shown as electrode wheels 14 and 15 mounted for rotation on shafts 16 and 17, respectively. A plurality of such electrodes 14 and 15 would typically be positioned on a common shaft so that many corrugation nodes can be welded to face sheet 11 simultaneously. In any event, sheets 11 and 13 move relative to electrode wheels 14 and 15 in the direction of the corrugations, to weld the nodes of corrugated sheet 13 to face sheet 11.

According to the present invention, and referring now to FIGS. 3-6, face sheet 12 is secured to the other side of corrugated sheet 13 by positioning face sheet 12 in contact with the other side of corrugated sheet 13 and by positioning a conductive mandrel 20 between face sheet 11 and corrugated sheet 13, where corrugated sheet 13 contacts face sheet 12. As can be seen from an examination of FIGS. 5 and 6, the top surface of mandrel 20 generally conforms to the configuration of corrugated sheet 13 whereas the bottom surface of mandrel 20 is generally planar. With panel 10 positioned between a pair of rotatable electrode wheels 21 and 22 mounted for rotation on shafts 23 and 24, respectively, electrical continuity can be achieved between electrodes 21 and 22 via sheet 11 and mandrel 20 in order to be able to weld sheet 13 to sheet 12.

Figure 5:
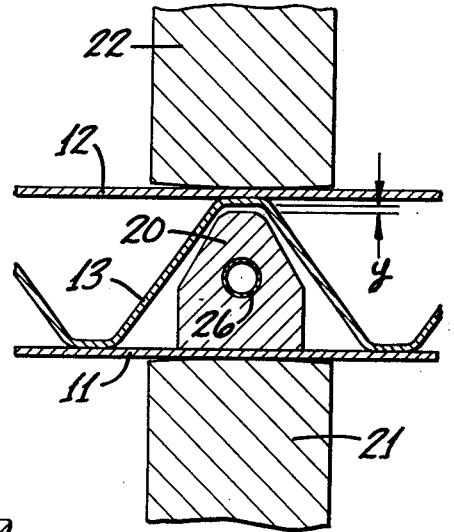
FIG. 5 is a sectional view taken along the line 5—5 in FIG. 3, prior to the application of the welding force.
Figure 6:
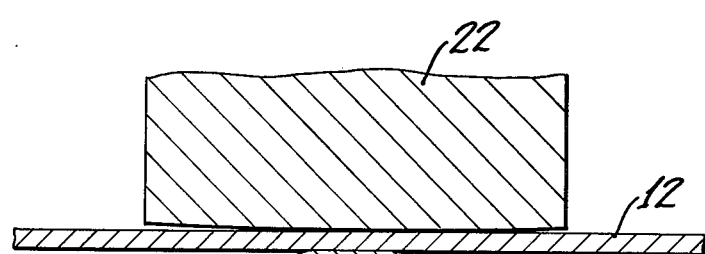
FIG. 6 is an enlarged sectional view taken along the line 5—5 in FIG. 3, showing the elastic deflection of the first face sheet upon application of the welding force.
Figure 6:
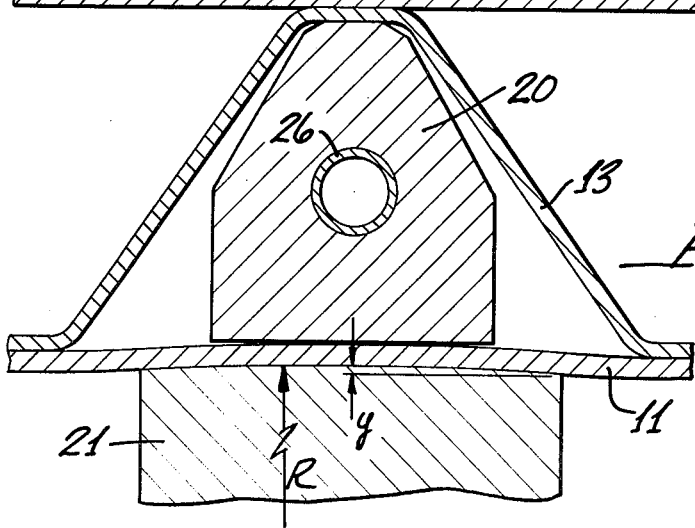

According to the present invention, and as shown most clearly in FIGS. 5 and 6, the height of mandrel 20 is less than the distance between face sheets 11 and 12, less the thickness of corrugated sheet 13, so that mandrel 20 is freely movable within the channel between sheets 11 and 13. Thus, in the resting state, as shown in FIG. 5, with mandrel 20 resting on face sheet 11, it is spaced from corrugated sheet 13. The spacing is a predetermined amount. This predetermined amount is calculated such that when a welding force is applied to sheets 11 and 12 by forcing electrodes 21 and 22 towards each other, face sheet 11 will elastically deflect to permit mandrel 20 to contact sheet 13 to complete the electrical circuit. The height of mandrel 20 is selected such that this deflection of face sheet 11 will not exceed the yield point thereof.

More specifically, all materials are elastic in the sense that an applied force will cause deflection, but the material will return to its original static position upon removal of the force, as long as the yield point of the material is not exceeded. This principle is utilized hereby by calculating the allowable face sheet elastic deflection and adjusting the height of mandrel 20 so that this deflection is not exceeded. With such an appropriate mandrel, a welding force can be applied to face sheets 11 and 12, via electrodes 21 and 22, respectively, to complete the electrical circuit between electrodes 21 and 22, via mandrel 20, whereupon current can be passed between electrodes 21 and 22 to complete the welding process. After the welding process has been completed, the welding force may be released, whereupon face sheet 11 will elastically return to its static position, allowing movement of mandrel 20.

Calculation of the appropriate height of mandrel 20 is achieved using conventional static beam loading equations. That is, the radius of curvature, R, of the deflected sheet 11 in the elastic range can be derived from the equation:

$$R = (EI/M) \quad (1)$$

where
E = modulus of elasticity of the material of face sheet 11;
I = the moment of inertia; and
M = the bending moment.

The bending stress $\sigma$ is also related to the bending moment and the moment of inertia by means of the equation:

$$\sigma = \frac{Mt}{2I} \quad (2)$$

where t = the thickness of face sheet 11.
Solving equation (2) for M, $$M = \frac{2\sigma I}{t} \quad (3)$$

and substituting this expression for M in equation (1), equation (1) reduces to:

$$R = \frac{Et}{2\sigma} \quad (4)$$

It can also be shown from simple geometric calculations that the distance y (see FIGS. 5 and 6), which is the difference between the height of mandrel 20 and the spacing between face sheet 11 and corrugated sheet 13, is related to the radius of curvature by the equation $$y = R - \sqrt{R^2 - \frac{P^2}{4}} \quad (5)$$

where P equals the unsupported length of face sheet 11, between its connection points to corrugated sheet 13.

Since all of the quantities in equations (4) and (5) are known or calculatable, it is a simple matter to calculate y. For example, for 316L stainless steel, where t = 0.060", $\sigma_{max}$ (the yield strength of the alloy) = 30,000 psi and E = 28 × 10 psi. Substituting these numbers into equation (4), it is found that R = 28". For a case where P = 2.0", substituting these values into equation (5) will permit derivation of a mandrel gap of y = 0.018".

According to the present invention, the radius of curvature of the outer surface of electrode 21 is selected to equal this calculated value of R so as to provide surface contact between electrode 21 and face sheet 11.

Figure 4:
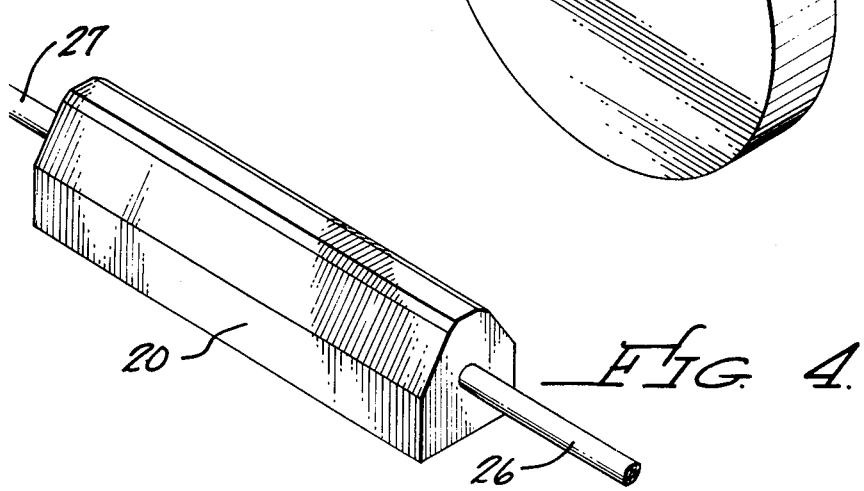
FIG. 4 is a perspective view of a short mandrel usable in the present method.
Figure 3:
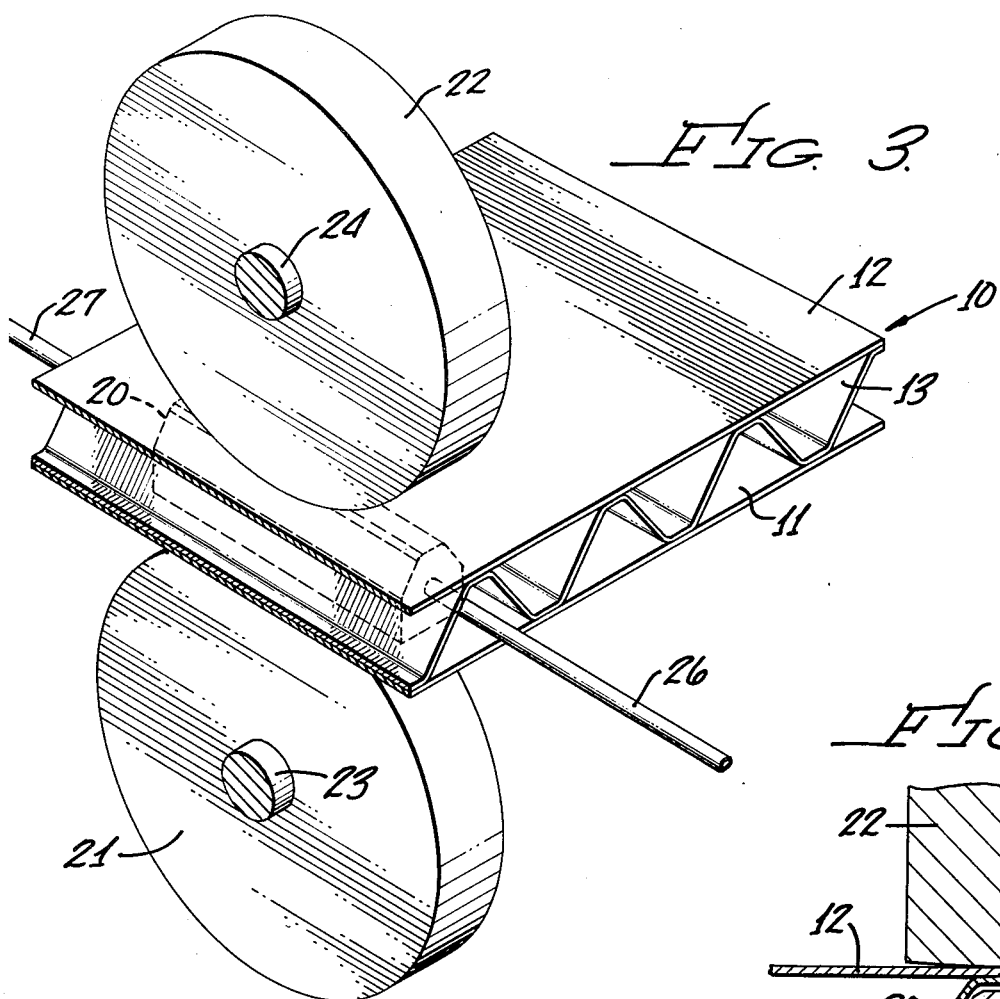
FIG. 3 is a perspective view of the present method for resistance welding the second face sheet to the corrugated sheet.

With mandrel 20 constructed in accordance with the teachings of the present invention, mandrel 20 will be freely slidable between face sheet 11 and corrugated sheet 13, when the electrode pressure is released, to eliminate the problems discussed hereinbefore. Accordingly, either a long mandrel, a slotted mandrel, or a two-piece mandrel could be used. However, in accordance with the prefered embodiment of the present invention, the mandrel pulling operation and the production of long, heavy, expensive mandrels is eliminated by the use of a short traveling mandrel, as shown in FIGS. 3 and 4. That is, a short length of mandrel, approximately two inches long, may be connected between a pair of mandrel pulling rods 26 and 27. In practice, rods 26 and 27 may be a continuous length of tubing extending through mandrel 20, through which water may be conducted for the purpose of cooling mandrel 20. With mandrel 20 positioned as shown in FIG. 3, a welding force can be applied, as described previously, and the welding operation completed. Thereafter, the welding force can be released, permitting face sheet 11 to elastically return to its static portion and providing the space between mandrel 20 and corrugated sheet 13. Sheets 11-13 can then be moved to another position relative to mandrel 20 and electrodes 21 and 22, the welding force reapplied, and the welding process repeated. This process of a traveling mandrel with the electrode force periodically applied and released as panel 10 moves between electrodes 21 and 22 can permit resistance welding in a rapid and economically feasible manner.

It can therefore be seen that according to the present invention, the problems encountered heretofor in fabricating lightweight, high strength, structural sandwich panel materials stabilized by a truss shaped core are solved in an economically feasible manner. The present fabrication method permits the formation of a family of truss core sandwich panels of various face sheet/core sheet thicknesses and core heights for use as a buildng material. Resistance welding is the joining process and conventional resistance welding equipment may be used. Mechanically expandable mandrels are eliminated, as well as long, expensive and heavy copper mandrels.

While the invention has been described with respect to the preferred embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A method of fabricating a truss core sandwich panel of the type including first and second face sheets secured on opposite sides of a corrugated sheet, comprising the steps of:
    (a) welding said first face sheet to one side of said corrugated sheet;
    (b) positioning said second face sheet in contact with the other side of said corrugated sheet;
    (c) positioning a conductive mandrel between said first face sheet and said corrugated sheet, the height of said mandrel being less than the distance between said first face sheet and said corrugated sheet by a given amount;
    (d) applying a force to said first and second face sheets to deflect said first face sheet so that opposite sides of said mandrel are in contact with said first face sheet and said corrugated sheet, said given amount being such that said deflection of said first face sheet will not exceed the yield point of said first face sheet;
    (e) welding said second face sheet to said corrugated sheet; and
    (f) releasing said welding force.

2. A method of fabricating a truss core sandwich panel according to claim 1, further comprising the steps of:
    (g) changing the position of said mandrel relative to said first face sheet and said corrugated sheet; and
    (h) repeating steps (d), (e) and (f).

3. A method of fabricating a truss core sandwich panel according to claim 2, wherein the length of said mandrel is significantly less than the length of the corrugations.

4. A method of fabricating a truss core sandwich panel according to claim 3, wherein the mandrel is moved along the panel in the direction of a corrugation with said force periodically applied and released, to weld said second face sheet to said corrugated sheet.

5. A method of fabricating a truss core sandwich panel according to claim 1, 2, 3, or 4, wherein said force is applied to said first and second face sheets by means of welding electrodes.

6. A method of fabricating a truss core sandwich panel of the type including first and second face sheets secured on opposite sides of a corrugated sheet, comprising the steps of:
    (a) welding said first face sheet to one side of said corrugated sheet;
    (b) positioning said second face sheet in contact with the other side of said corrugated sheet;
    (c) positioning a conductive mandrel between said first face sheet and said corrugated sheet, the height of said mandrel being less than the distance between said first and second face sheets, less the thickness of said corrugated sheet, by a predetermined amount;
    (d) positioning said first and second face sheets between opposed welding electrodes, said mandrel being coplanar with said electrodes;
    (e) applying a welding force to said first and second face sheets by means of said electrodes, said force being sufficient to elastically deflect said first face sheet into contact with said mandrel and to bring said mandrel into contact with said corrugated sheet to permit electrical continuity between said electrodes;
    (f) passing current between said first and second electrodes to weld said second face sheet to said corrugated sheet; and
    (g) releasing said welding force.

7. A method of fabricating a truss core sandwich panel according to claim 6, further comprising the steps of:
    (h) changing the relative positions of said mandrel and said first face sheet and said corrugated sheet; and
    (i) repeating steps (e), (f), and (g).

8. A method of fabricating a truss core sandwich panel according to claim 7, wherein the length of said mandrel is significantly less than the length of the corrugations.

9. A method of fabricating a truss core sandwich panel according to claim 8, wherein the mandrel is moved along the panel in the direction of a corrugation with said welding force periodically applied and released, to weld said second face sheet to said corrugated sheet.

10. A method of fabricating a truss core sandwich panel of the type including first and second face sheets secured on opposite sides of a corrugated sheet, comprising the steps of:
    (a) welding said first face sheet to one side of said corrugated sheet;
    (b) positioning said second face sheet in contact with the other side of said corrugated sheet;
    (c) calculating the allowable elastic deflection of said first face sheet which will not exceed the yield point thereof;
    (d) positioning a conductive mandrel between said first face sheet and said corrugated sheet, the height of said mandrel being less than the distance between said first face sheet and said corrugated sheet by said calculated amount of allowable deflection;

(e) applying a welding force to said first and second face sheets to elastically deflect said first face sheet so that opposite sides of said mandrel are in contact with said first face sheet and said corrugated sheet;

(f) welding said second face sheet to said corrugated sheet; and (g) releasing said welding force.

11. A method of fabricating a truss core sandwich panel according to claim 10, further comprising the steps of:

(h) moving said panel relative to said mandrel; and (i) repeating steps (e), (f) and (g).

12. A method of fabricating a truss core sandwich panel according to claim 11, wherein the length of said mandrel is significantly less than the length of the corrugations.

13. A method of fabricating a truss core sandwich panel according to claim 12, wherein said mandrel is moved relative to said panel from one side of said panel to the other in the direction of a corrugation, with said force periodically applied and released, to weld said second face sheet to said corrugated sheet.

14. A method of fabricating a truss core sandwich panel according to claim 10, 11, 12, or 13, wherein said force is applied to said first and second face sheets by means of welding electrodes.

* * * * *